No. 726,775.  PATENTED APR. 28, 1903.
G. SLOAN.
HARROW.
APPLICATION FILED FEB. 3, 1903.
NO MODEL.
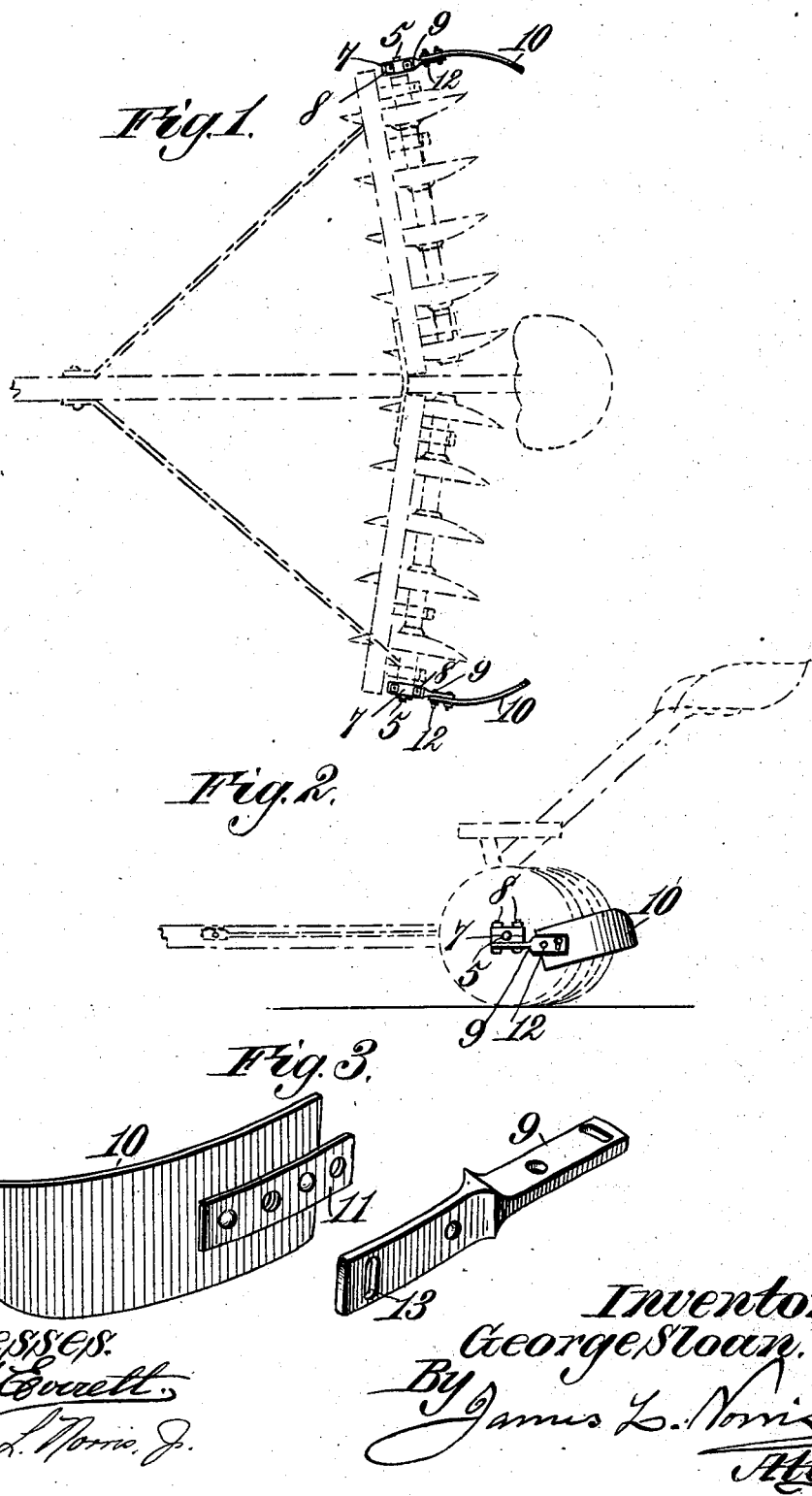
Witnesses:
Robert Everett.
James L. Norris, Jr.
Inventor:
George Sloan.
By James L. Norris.
Atty.

UNITED STATES PATENT OFFICE.

GEORGE SLOAN, OF WILBER, NEBRASKA.

HARROW.

SPECIFICATION forming part of Letters Patent No. 726,775, dated April 28, 1903.

Application filed February 3, 1903. Serial No. 141,712. (No model.)

*To all whom it may concern:*

Be it known that I, GEORGE SLOAN, a citizen of the United States, residing at Wilber, in the county of Saline and State of Nebraska, have invented new and useful Improvements in Harrows, of which the following is a specification.

This invention relates to harrows.

I provide in connection with the harrow elements a blade in coöperative relation with the same, said blade being vertically adjustable, so that it can be raised from or lowered toward the ground over which the harrow travels, and being laterally adjustable with respect to said harrow elements. In the case of corn just above the ground it is desirable that earth thrown sidewise by the harrow elements should not cover such new corn, and to secure this result is one of the objects of the invention, the blade in question being for this purpose. When the corn is just above the ground, the blade is lowered nearly to the ground, so that earth thrown sidewise by the harrow elements will be prevented by the blade from covering such new corn. As the corn grows older the blade is elevated, so that the earth can be thrown sidewise and around the bases of the cornstalks, it not being necessary at this stage to protect the corn, but rather advantageous to hill the bases of the stalks with the earth. The side or lateral adjustment of the blade is to enable the latter to be moved toward or from a row of corn, due to slight variations in the distance between the rows. I provide means for holding the blade in its adjustments.

I do not limit the use of the invention to any particular style of harrow, but find the same especially advantageous in connection with disk harrows and in this case unite the blades with the opposite end of the axle to which the disks are connected, each blade of course having the vertical and lateral adjustment mentioned.

While the attachment to the harrow has demonstrated its efficiency for the purpose intended, it adds practically nothing to the weight or expense thereof.

The invention is illustrated in one simple and convenient embodiment thereof in the accompanying drawings, forming a part of this specification, and in which—

Figure 1 is a plan view of a harrow equipped with an attachment constructed in accordance with the invention. Fig. 2 is a side elevation of the same. Fig. 3 is a detail view in perspective of the blade and the immediate parts coöperative therewith, the same being detached in order to more clearly show the structure thereof.

Like characters refer to like parts throughout the several figures.

Referring to Figs. 1 and 2, I have shown a disk harrow of common construction in connection with which my improvement may be utilized; but I do not restrict myself to the use of such improvement to any particular style of cultivator. Referring to said figures, the numeral 5 designates the usual axle, extending entirely across the implement and furnished with the disks 6.

In the present case I provide two blades and preferably connect them with the opposite ends of the axle 5; but this of course is not essential. I will now describe in detail one of the blades and the manner of connecting the same with the adjacent end of the axle 5, such structure being a duplication of that upon the opposite end of the axle, so that a description of one will suffice for both.

A two-part box 7 is fitted to the outer end of the axle 5, being held thereto by bolts 8 or equivalent securing means passing therethrough, said box serving to receive upon its upper side the flat horizontal portion of an arm 9, constituting a carrier for the blade 10, hereinafter more particularly described, the bolts which extend through the parts of the box 7 also passing through the said horizontal flat portion of the arm 9, what might be considered the rear bolt constituting a pivot and passing through a perforation in the arm, while the forward bolt extends through a curved slot formed on an arc struck from the said pivot-bolt. By loosening the forward bolt it will be understood that the arm 9 can be adjusted laterally of the disks 6. The outer portion of the arm is flat, and the blade 10 fits against the vertical portion of the arm, upon the outer face thereof. Upon the outer face of the blade and substantially centrally of the height thereof is fastened a reinforcing-strip 11 by means of rivets or analogous means, the inner end of the strip extending beyond the corresponding end of the blade and being perforated to receive the inner of a pair of bolts 12, extending through a perforation in the vertical portion of the arm 9 in line with the said perforation in the strip. The inner of the two bolts constitutes a pivot upon which the blade moves during its vertical adjustment. The outer of the two bolts 12 extends through a curved and substantially vertical and elongated slot 13 near the outer end of the arm 9 and also through the blade 10 and reinforcing-strip 11, respectively, the slot 13 being formed upon an arc struck from the inner bolt 12. By loosening the nut of the forward of the two bolts 8 it will be apparent that the arm 9, and consequently the blade 10 carried thereby, can be swung laterally with respect to the disks 6 in order to adjust the blade 10, and when the necessary adjustment of said blade has been secured the nut of the forward or adjusting bolt will be tightened in order to hold the blade in the desired adjusted position. By loosening the nut of the outer bolt 12 the blade 10 can be adjusted upward or downward with respect to the ground over which the harrow travels, and when said blade is in its desired adjusted position the nut of the outer or adjusting bolt will be tightened, so as to hold the said blade firmly in its vertically-adjusted position. The vertical adjustment of the blades is for the purpose of moving them toward or from the ground to suit the condition of the growing vegetables, as hereinbefore stated, while the lateral adjustment of the blades is to carry them toward or from the rows of such vegetables.

The blades 10 are usually made of metal and are slightly concaved inwardly.

I do not limit myself to the exact means for effecting the vertical and sidewise adjustment of the blade hereinbefore specified, for other devices than those set forth may be employed with equal facility.

Having thus described the invention, what I claim is—

1. In a harrow, the combination of the axle thereof having disks, and blades connected with the opposite ends of said axle, said blades being vertically adjustable and also laterally adjustable with respect to said disks.

2. In a harrow, the combination of an axle, harrow elements carried by said axle, boxes fastened to the opposite ends of the axle, arms pivotally mounted upon said boxes, whereby said arms are laterally adjustable with respect to the harrow elements, means for holding the arms in their adjusted positions, and blades vertically adjustable upon the outer ends of the arms.

3. In a harrow, the combination of an axle and disks carried thereby, boxes upon the opposite ends of the axle, arms pivoted upon the boxes, having curved slots formed on an arc struck from the pivots, holding devices passing through the slots, blades pivoted to the outer ends of the arms, said arms having curved slots formed upon arcs struck from the centers of the pivots, and holding devices passing through the blades and last-mentioned slots.

In testimony whereof I have hereunto set my hand in presence of two subscribing witnesses.

GEORGE SLOAN.

Witnesses:
PHILIP HOFFMANN,
JOS. CIRING.